United States Patent [19]

Nix et al.

[11] 4,454,632
[45] Jun. 19, 1984

[54] SHIPPING AND INSTALLATION STRAP FOR LINEAR ACTUATOR

[75] Inventors: Richard Nix, Utica; Keith V. Leigh-Monstevens, Troy, both of Mich.

[73] Assignee: Automotive Products plc, United Kingdom

[21] Appl. No.: 344,495

[22] Filed: Feb. 1, 1982

[51] Int. Cl.³ .................. B65D 63/00; B60T 11/30
[52] U.S. Cl. .................. 24/16 PB; 60/636; 60/684; 92/15; 92/23; 215/250; 220/89 A; 220/265
[58] Field of Search ............ 24/16 PB, 17 AP; 403/2; 215/250; 220/89 A, 265; 137/68 R, 68 A, 70, 71; 92/15, 23; 60/635, 636, 684, 685

[56] References Cited

U.S. PATENT DOCUMENTS

| 285,385 | 9/1883 | Brundage | 215/250 |
|---|---|---|---|
| 1,453,178 | 4/1923 | Petry | 92/23 |
| 3,529,417 | 9/1970 | Knight | 60/636 |
| 3,556,575 | 1/1971 | Farkas | 24/16 PB |
| 3,708,835 | 1/1973 | Bienz | 24/16 PB |
| 4,317,470 | 3/1982 | Taylor | 137/71 |

FOREIGN PATENT DOCUMENTS

2353888  11/1974  Fed. Rep. of Germany .......... 92/23

*Primary Examiner*—Gene Mancene
*Assistant Examiner*—David L. Tarnoff
*Attorney, Agent, or Firm*—Hauke and Patalidis

[57] ABSTRACT

A disposable rupturable shipping and installation strap holding in a retracted position the output member of a linear actuator such as a pre-filled pre-bled hydraulic actuator. The strap has a retaining member fitted over the end of the actuator output member and a pair of symmetrically disposed strips or bands integrally formed with the retaining member and attached at their other end to a portion of the actuator housing. The strips or bands have portions of reduced strength which cause the strap to break and free the actuator output member upon first operation of the actuator. Preferably, the strap is molded of relatively thin flexible plastic.

19 Claims, 15 Drawing Figures

SHIPPING AND INSTALLATION STRAP FOR LINEAR ACTUATOR

BACKGROUND OF THE INVENTION

The present invention relates to an apparatus and method for shipping and installing a linear actuator. More particularly, the present invention relates to a shipping and installation strap for holding in a retracted position the output member of a linear actuator such as a hydraulic actuator during transportation and storage and during installation of the actuator for operation of a mechanism.

Hydraulic actuator apparatus are known for operating a mechanism at a remote location by way of a master cylinder, for example, connected to a slave cylinder installed at the remote location. A conduit interconnects the master cylinder to the slave cylinder, and the hydraulic apparatus is filled with hydraulic fluid such that when the piston of the master cylinder is actuated, the piston of the slave cylinder, and consequently the piston rod or output member, is simultaneously actuated by displacement of the hydraulic flulid from the master cylinder to the slave cylinder through the conduit.

More particularly, it is known to provide such hydraulic apparatus for operating, for example, the release mechanism of a friction clutch. As disclosed in British patent specification No. 1,539,879, and in corresponding application for U.S. patent, Ser. No. 911,477, which is a continuation of application Ser. No. 676,474, it is also known to pre-assemble friction clutch hydraulic release apparatus, by filling with hydraulic fuuid the master cylinder, the slave cylinder, the conduit interconnecting the cylinders and a reservoir connected to the master cylinder, and bleeding the system before shipment of the assembly to a motor vehicle manafacturer, for installation on a motor vehicle. Preferably, the hydraulic apparatus is filled with fluid maintained by a resilient diaphragm disposed in the reservoir of fluid, at a pressure slightly higher than atmospheric pressure to prevent introduction of atmospheric air into the system during transportation, storage and installation. Prior to installation, the piston rod, or output member, projecting from one end of the slave cylinder may become extended such that the over-all length of the slave cylinder, with the piston rod extended, may occupy more space than necessary in the shipping container, the rod may become bent or damaged while in transit or storage or become disconnected from the piston, the pressure of the fluid may drop below atmospheric pressures, thus causing air to be introduced into the hydraulic apparatus and the slave cylinder piston rod must be manually retracted, and held retracted during installation of the apparatus in the motor vehicle.

SUMMARY OF THE INVENTION

The principal object of the present invention, therefore, is to provide a restraining strap for the output member of a linear actuator such as the piston rod of a slave cylinder of a pre-filled and pre-bled sub-assembly comprising a master cylinder, a slave cylinder and a conduit interconnecting the master cylinder with the slave cylinder. The object of the invention is achieved by providing a flexible, preferably plastic, strap having a portion maintaining the slave cylinder piston rod in a retracted position by attaching the end of the piston rod to the housing of the slave cylinder, the strap having appropriate weakened break-away sections defining one or more rupture portions, such that when the piston of the master cylinder is actuated for the first time, thus causing a thrust to be applied to the piston and piston rod of the slave cylinder, the strap is broken and the apparatus is enabled to operate in a normal manner.

These and other objects and advantages of the present invention will become apparent to those skilled in the art when the following description of examples of the best modes contemplated for practicing the invention is read in conjunction with the accompanying drawing wherein like reference numerals refer to like or equivalent parts, and in which:

DETAILED DESCRIPTION OF THE PREFERRED EMBODIMENTS

Figures 1, 2, 3:
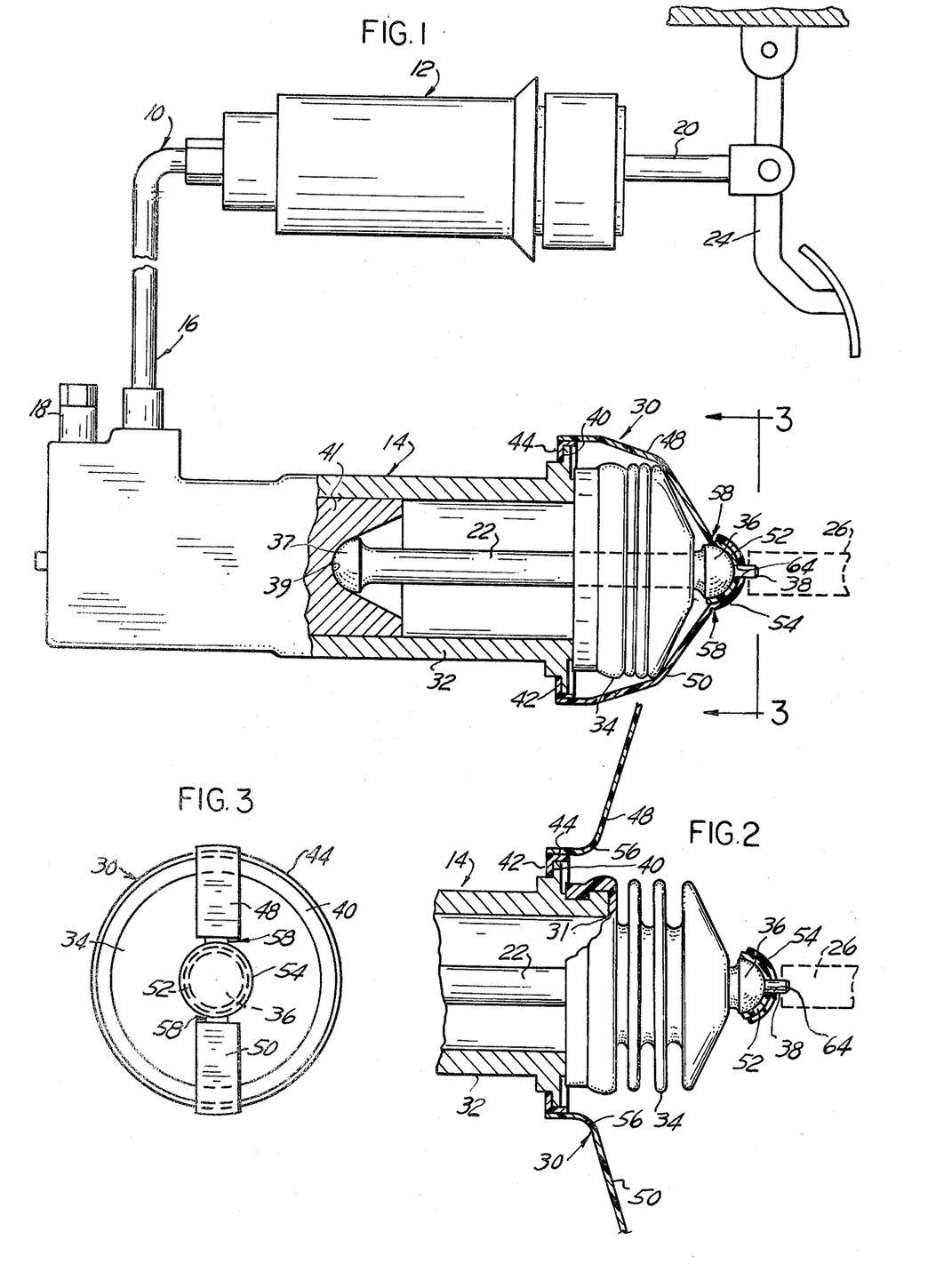
FIG. 1 is a schematic illustration of a hydraulic apparatus having a slave cylinder, shown partially in section and provided with an example of structure for a shipping and installation restraining strap according to the present invention.
FIG. 2 is a partial view similar to FIG. 1, but showing the broken strap after the first operation of the apparatus.
FIG. 3 is a front elevation view from line 3—3 of FIG. 1.

Referring now to the drawing and more particularly to FIG. 1, there is schematically illustrated a hydraulic apparatus assembly 10 comprising a master cylinder 12 hydraulically interconnected to a slave cylinder 14 by means of a conduit 16, in the form of a flexible hose, for example. After assembly of the diverse components, the whole system is filled with a hydraulic fluid under slight pressure and bled to remove air from the system by way of a bleed valve 18, mounted for example, on the slave cylinder 14, until all air has escaped from the hydraulic system. An additional reservoir of hydraulic fluid, not shown, is connected to the master cylinder 12. The reservoir of hydraulic fluid may take the form of a built-in reservoir integral with, or directly attached, to the master cylinder housing, or it may be a remotely located reservoir connected by a conduit to the master cylinder 12. The hydraulic fluid is maintained during transport, storage and installation at a pressure slightly higher than atmospheric pressure by an accumulator consisting, for example, of a resilient diaphragm disposed in the fluid reservoir.

As is well known, any displacement of the master cylinder piston rod 20 causes a corresponding displacement of the piston rod or actuator 22 of the slave cylinder 14, as a result of transferring a portion of the hydraulic fluid from the master cylinder 12 through the conduit 16 to the slave cylinder 14. The piston rod 20, or input member, of the master cylinder 12 may be operated, for example, by the clutch release pedal 24 of a motor vehicle, the master cylinder 12 being installed, for example, below the floorboard of the motor vehicle driver compartment, the slave cylinder 14 being attached on the underframe of the vehicle in an appropriate position such that the end of its piston rod 22 actuates the release mechanism 26 of the motor vehicle friction clutch, not shown.

During assembly of the slave cylinder 14, a shipping and installation strap 30 is installed, according to the present invention, such as to restrain the slave cylinder piston rod 22 from extending beyond a certain limit from the open end 31 of the slave cylinder housing 32, FIG. 2. An elastomeric bellows boot 34 has an end affixed to the rim of the cylinder housing 32 and another end elastically engaging a portion of the peripheral surface of the piston rod 22 for the purpose of protecting the covered portion of the piston rod 22 from the ambient and preventing introduction of foreign matter and dirt into the open end 31 of the cylinder housing 32 through which the rod 22 projects. In the structure illustrated, the end of the rod 22 projecting from the slave cylinder housing 32 has a hemispherical portion 36, provided with a reduced diameter coaxial projecting pin-like member 38 for engagement and centering with the end of the clutch release mechanism 26. The other end of the rod 22 has a hemispherical enlarged portion 37 freely engaged in a corresponding tapered hemispherical recess 39 formed at the bottom of the slave cylinder piston 41.

Figure 4:
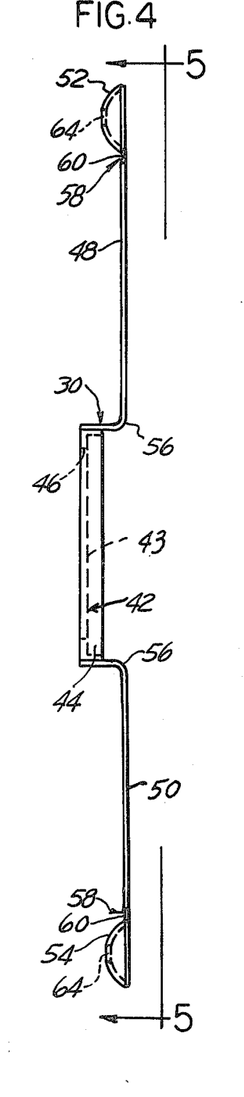
FIG. 4 is a side elevation view of the restraining strap of FIGS. 1-3.
Figure 5:
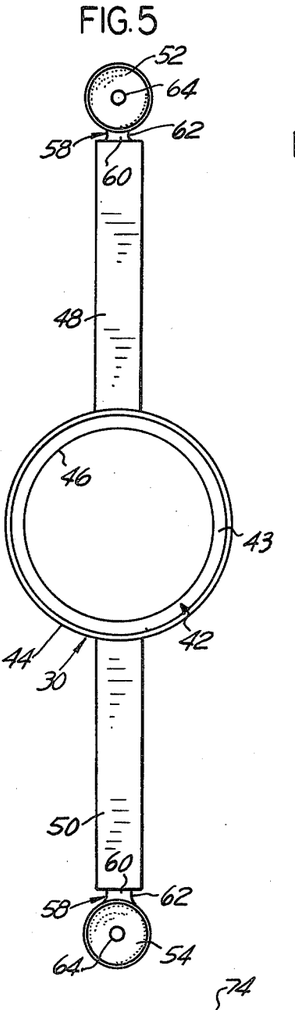
FIG. 5 is a plan view thereof as seen from lines 5—5 of FIG. 4.

The slave cylinder housing 32 is provided with a peripheral annular flange 40, and the strap 30 has a corresponding annular flange collar 42, comprising an annular flange 43 formed on one side of a cylindrical rim 44 fitting over the housing annular flange 40, the strap annular flange 43 forming an opening 46, FIGS. 4 and 5, fitting over the slave cylinder housing 32. A pair of diametrally disposed bands or strips 48 and 50 are heat-welded to, or molded integrally with, the rim 44 of the flange collar 42 at one of their ends and provided with a nosepiece or retaining member in the form of a partially spherical cup member, 52 and 54 respectively, at their other end. The strap 30 is preferably molded of plastic such as a polyamide (nylon), and the bands or strips 48-50 are relatively flexible. The strap 30 is molded in the shape illustrated at FIGS. 4 and 5, i.e. with a pre-formed bend 56 proximate the end of each band or strip 48 or 50 joined to the rim 44 of the flange collar 42. The other end of each band or strip 48-50 is provided with a weakened portion 58 where it is integrally molded with the partially spherical cup member 52-54, each weakened portion 58 being in the form of a reduced thickness portion as shown at 60, resulting from a surface groove, most clearly shown at FIG. 4, or a reduced width portion, as shown at 62 at FIG. 5, or both.

The partially spherical cup members 52 and 54 are each provided with a central aperture 64 through which passes the pin-like projection 38 on the piston rod end 36, when the strap 30 is installed during assembly of the apparatus in the position illustrated at FIG. 1, with the partially spherical cup members 52 and 54 disposed over the hemispherical end 36 of the piston rod 22, such as to maintain the piston rod 22 in a retracted and centered position.

After installation of the hydraulic apparatus 10 in a motor vehicle, the first time the clutch release mechanism is actuated by operating the clutch pedal 24, hydraulic fluid is supplied from the master cylinder 12, when the piston rod 20 of the master cylinder is reciprocated, to the slave cylinder 14 through the line or conduit 16, such that the slave cylinder piston rod 22 is extended, for example to the position shown at FIG. 2. Although the weakened portions 58 of the bands or strips 48-50 of the strap 30 are capable of holding the slave cylinder piston rod 22 in its retracted and centered position during shipping, storage and installation of the hydraulic apparatus 10 in a motor vehicle, the force exerted on the slave cylinder piston 41 during the first operation of the clutch release causes the strap bands or strips 48 and 50 to break away from the cup members 52 and 54, respectively, when the piston rod 22 is extended, thus subsequently permitting normal operation of the hydraulic apparatus 10.

Although the strap 30 may be molded of any convenient flexible plastic, polyamide plastic such as nylon type 6/6, for example sold by E. I. DuPont de Nemours & Co. under the trademark Zytel has been found particularly convenient, the strap bands or strips 48 and 50 having a thickness, for example, of 0.6 to 1 mm, and a width of 8 to 12 mm., with a break-out groove 60 0.15 to 0.3 mm. in depth and/or a reduction in width of each band or strip at the junction with the cup members 52 and 54, as shown at 62 at FIG. 5, being slightly more than one-half the width of the bands or strips themselves.

Figure 6:
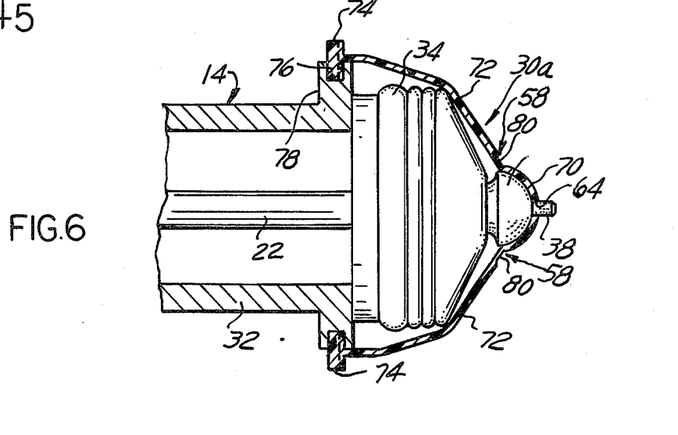
FIG. 6 is a partial view similar to FIG. 1, but showing a modification of the restraining sprap according to the present invention.
Figure 7:
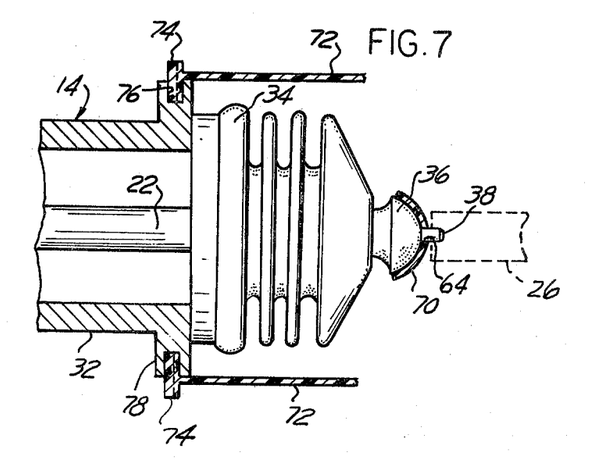
FIG. 7 is a view similar to FIG. 6, but showing the condition of the strap after operation of the slave cylinder.
Figures 8, 9:
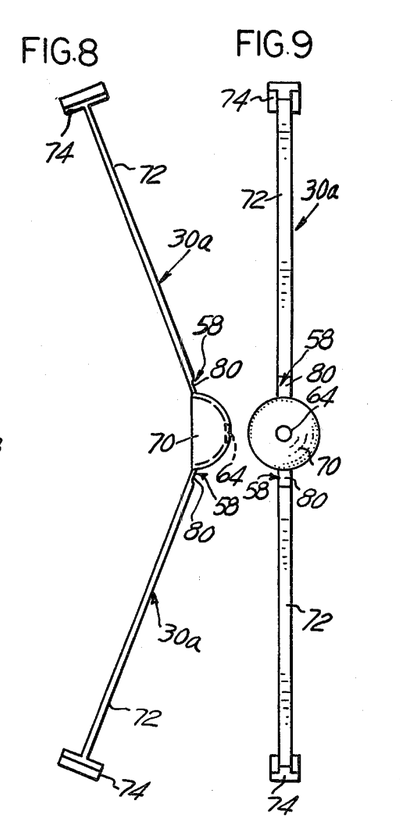
FIG. 8 is a side elevation of the example of strap of FIG. 6.
FIG. 9 is a plan view thereof.

The present invention is susceptible of various modifications for accomplishing its objects of convenience of shipping and installation of pre-filled and pre-bled hydraulic apparatus. An example of such modification is illustrated at FIGS. 6-9 wherein a shipping and installation strap 30a is illustrated as comprising a single cup-shaped piston rod retaining member 70, disposed over the end 36 of the piston rod 22 of a slave cylinder 14, FIG. 6, provided with diametrally disposed bands or strips 72 each having an integral strut 74 formed on the end thereof, substantially at right angle to the axis of each band or strip. The inner end of each strut 74 is introduced in a receiving recess 76 formed in an annular flange 78 disposed proximate the end of the slave cylinder housing 32. A weakened portion 58 in the form of a break-away groove, as shown at 80, is formed at the junction between the other end of each band or strip 72 and the cup-shaped retaining member 70 such that, when hydraulic fluid is fed to the slave cylinder 14, thus causing its piston rod 22 to extend, the bands or strips 72 separate at the weakened portions 58 from the cup-shaped retaining member 70 and free the piston rod 22 for normal operation, as illustrated at FIG. 7.

In such an arrangement, with the struts 74 relatively loosely fitted in the receiving recesses 76 in the slave cylinder annular flange 78, after the bands or strips 72 become separate from the cup-shaped retaining member 70 in the course of the first release of the motor vehicle friction clutch, which generally occurs at the end of the assembly line, the bands or strips 72 generally drop off. If they remain attached to the slave cylinder housing, they do not interfere with normal operation of the clutch.

Figure 10:
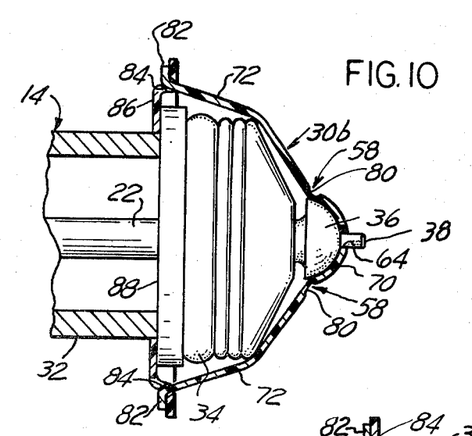
FIG. 10 is a view similar to FIG. 6, but showing a further modification of a restraining strap according to the present invention.
Figure 11:
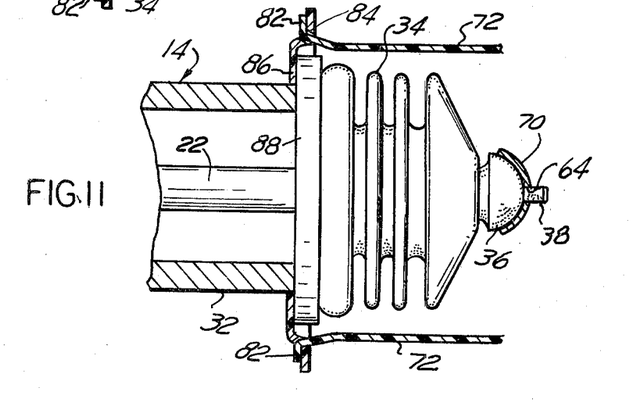
FIG. 11 is a view similar to FIG. 10, but showing the condition of the strap after operation of the slave cylinder.

At FIGS. 10-11 there is illustrated a further modification 30b of a shipping and installation strap according to the present invention for restraining and centering the output member of a linear actuator, such as the piston rod 22 of a slave cylinder 14, in its retracted position until the linear actuator or slave cylinder, is first operated. The restraining strap 30b is substantially alike the strap 30a of FIGS. 6-9, the bands or strips 72 being, however, provided on their free end with a lug 82 snapped through an aperture 84 disposed in a ring such as the metallic ring 86 slipped over the cylinder housing 32 and adapted to engage an annular flange 88 on the peripheral surface of an end of the housing 32. When fluid is first applied, after installation of the hydraulic apparatus, to the slave cylinder 14, causing the piston rod 22 to extend, the weakened portion 58 formed by the break-away groove 80 at the junction between the bands or strip 72 and the cup-shaped retaining member 70 causes the bands or strips 72 to separate from the retaining member, as shown in FIG. 11, thus permitting the piston rod 22 to operate in the usual manner. The loose bands or strips 72 also generally fall off during first operation of the hydraulic apparatus.

It will be appreciated by those skilled in the art that the retaining members 52-54 and 70 of the straps 30, FIGS. 1-5, 30a, FIGS. 6-9, and 30b, FIGS. 10-11, are adapted to restrain and center the end of a linear actuator output member, such as the piston rods 22 provided with a hemispherical portion 36, whether or not the hemispherical portion 36 has a reduced diameter coaxial projecting pin-like member 38. The strap retaining members 52-54, FIGS. 1-5, and 70, FIGS. 6-11, do not interfere with the operation of the clutch release mechanism, and they may eventually wear out or fall off without affecting the operation of the clutch release mechanism.

Figure 12:
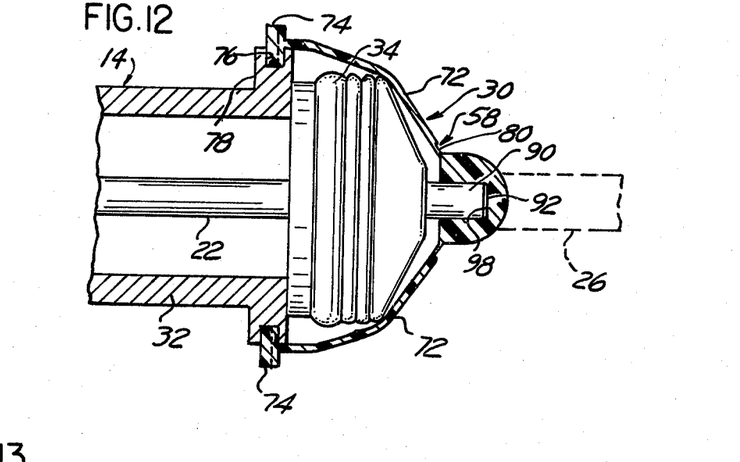
FIG. 12 is a view similar to FIG. 6, but showing another modification of a restraining strap to the present invention.

A modified restraining and centering shipping and installation strap, as represented by the example of strap 30c of FIGS. 12-15, is particularly adapted for retaining and centering the output member of a linear actuator such as the slave cylinder piston rod 22, FIG. 12, having a cylindrical end 90 provided with a flat end face 92. The strap 30c is substantially alike the strap 30a of FIGS. 8 and 9, i.e. having a pair of band or strips 72 terminating each at one end in an integrally molded strut 74, substantially at right angle to the axis of each band or strip, having a portion introduced in a receiving recess 76 in the annular flange 78 formed proximate the end of the slave cylinder housing 32, FIG. 12. The strips or bands 72 diametrically project from the edge of a substantially hemispherical retaining member 94, integrally molded therewith and joined thereto by way of weakened portions 58 each in the form of a groove 80. The substantially hemispherical retainer member 94 has coaxial blind bores 96 forming a bottom surface 98 against which abut the end face 92 of the rod cylindrical end 90, when the strap 30c is installed with its retaining member 94 placed over the end 90 of the rod 22, the rod cylindrical end 90 being introduced into the retaining member bore 96. The retaining member bore 96 is preferably provided with a plurality of longitudinal grooves 100, best shown at FIG. 15, for aid in installation of the restraining strap 30c to allow air or oil to escape from the bore 96 when the retaining member 94 is pushed over the rod end 90.

Figure 13:
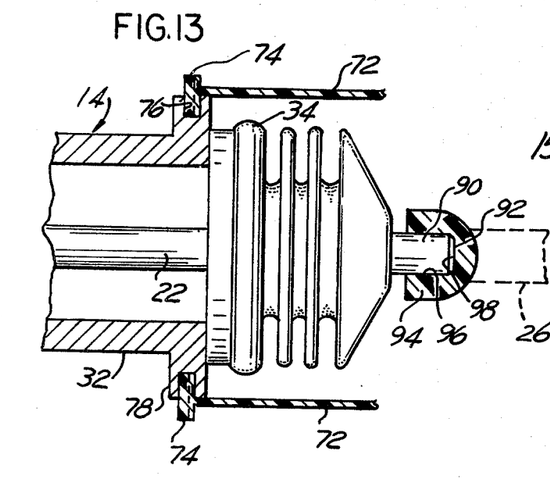
FIG. 13 is a view similar to FIG. 12 but showing the condition of the strap after operation of the slave cylinder.
Figures 14, 15:
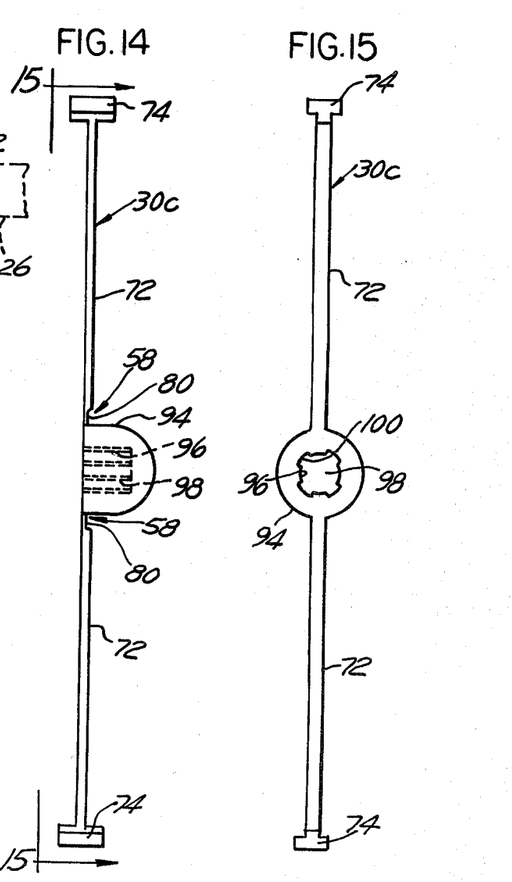
FIG. 14 is a side elevation view of the restraining strap of FIG. 12.
FIG. 15 is a rear elevation view thereof as seen from line 15—15 of FIG. 14.

When the slave cylinder 14 is first operated, the bands or strips 72 separate or break away from the substantially hemispherical retaining member 94 at the surface grooves 80 forming the weakened sections 58 of the strap. In the structure of FIGS. 12-15, the substantially hemispherical retaining member 94 is molded with a substantial wall thickness, and remains in position, as shown at FIG. 13, during operation of the clutch release mechanism. The peripheral surface of the retaining member 94 actually forms a spherical bearing interposed between the flat end face 92 of the piston rod 22 and the end of the clutch release control member 26.

It will be appreciated by those skilled in the art that the present invention, although disclosed for illustrative purposes in specific structures in conjunction with a specific hydraulic apparatus, has many practical applications in shipping and installing diverse linear actuators of any form whatsoever wherein it is desired to restrain against displacement the actuator output member until after installation, and to free the output member for normal operation upon first actuation.

Having thus described the present invention by way of examples of structure thereof, modifications whereof will be apparent to those skilled in the art, what is claimed as new is as follows:

1. A shipping and installation restraining strap for a hydraulic actuator for operating a motor vehicle clutch, said hydraulic actuator forming part of an apparatus comprising a master cylinder, said hydraulic actuator and a conduit connecting said master cylinder and said hydraulic actuator, said master cylinder, conduit and hydraulic actuator being prefilled with hydraulic fluid prior to installation on a motor vehicle, said hydraulic actuator having a housing and a linearly movable output member projecting from said housing, wherein said linearly movable output member has an end connectable to an operating member of a motor vehicle clutch and said strap holds said output member in a retracted position until after installation of said hydraulic actuator on said motor vehicle, said strap comprising a retaining member having a configuration which is different from said strap and engages the end of said output member, a strip having an end attached to said retaining member, and means attaching the other end of said strip to a non-movable portion of the housing of said actuator, said strip being disposed substantially on the exterior of said housing, said strip having a portion of reduced strength between the ends of said strip whereby said strip is ruptured at said portions of reduced strength upon first operation of said motor vehicle clutch after installation of said prefilled master cylinder, conduit and hydraulic actuator on said motor vehicle.

2. The strap of claim 1 comprising a pair of strips symmetrically arranged and each attached at an end to said retaining member.

3. The strap of claim 2 wherein each of said strips has a retaining member on the end thereof, each of said retaining members has an aperture, and the end of said output member has a projecting portion disposed through said apertures.

4. The strap of claim 1 wherein said portion of reduced strength comprises a portion of reduced width.

5. The strap of claim 1 wherein said portion of reduced strength comprises a portion of reduced thickness.

6. The strap of claim 5 wherein said portion of reduced strength further comprises a portion of reduced width.

7. The strap of claim 2 wherein said means for attaching said strips to said housing comprises an annular flange on said housing and an annular flange collar at the other end of each of said strips, said flange collar having a flange portion abutting against said annular flange.

8. The strap of claim 2 comprising a single retaining member, wherein said strips are attached to said retainer member at one end and each of said strips has at its other end means for attachment to a portion of the housing of said actuator.

9. The strap of claim 8 wherein said attachment means comprises a strut integrally formed on said other end of each of said strips and a recess in said housing in which said strut is engaged.

10. The strap of claim 8 wherein said attachment means comprises a lug integrally formed on said other end of each of said strips, and a flange on said housing having a pair of apertures, each of said lugs being passed through each of said apertures.

11. The strap of claim 2 wherein said retaining member is a partially spherical cup member for fitting over the end of said output member, said output member having a corresponding spherical end portion.

12. The strap of claim 2 wherein said retaining member has a bore provided with an end surface, and said output member has an end face engageable with said surface.

13. The strap of claim 2 wherein said retaining member forms a bearing surface between said output member and an actuated mechanism.

14. The strap of claim 1 wherein said strap is made of plastic.

15. The strap of claim 2 wherein said strap is made of plastic.

16. The strap of claim 13 wherein said strap is made of plastic.

17. A method of shipping and installing a hydraulic actuator for operating a motor vehicle clutch, said hydraulic actuator forming part of an apparatus comprising a master cylinder, said hydraulic actuator and a conduit connecting said master cylinder and said hydraulic actuator, said hydraulic actuator having a housing and a linearly movable output member projecting from said housing, wherein said linearly movable output member has an end connectable to an operating member of a motor vehicle clutch, said method comprising restraining said output member in a retracted position by means of a strap comprising a strip having an end, providing said strip with a portion of reduced strength, attaching said strip to said housing such that said strip is disposed substantially on the exterior thereof, prefilling said apparatus with hydraulic fluid prior to shipment of said apparatus, and installing said apparatus on a motor vehicle while maintaining said output member of said hydraulic actuator in said retracted position by means of said strap, whereby said strip is caused to break and free said output member upon first actuation of said apparatus after installation on a motor vehicle.

18. The method of claim 17 wherein said strap has a pair of symmetrically disposed strips.

19. The method of claim 17 wherein said hydraulic fluid in said actuator is at a pressure higher than atmospheric pressure.

* * * * *

UNITED STATES PATENT AND TRADEMARK OFFICE
CERTIFICATE OF CORRECTION

PATENT NO. : 4,454,632
DATED : June 19, 1984
INVENTOR(S) : Keith V. Leigh-Monstevens and Richard Nix It is certified that error appears in the above-identified patent and that said Letters Patent are hereby corrected as shown below:

In the claims:

Column 6, line 57          "portions" should read --portion--

Signed and Sealed this

*Twenty-sixth* Day of *February 1985*

[SEAL]

*Attest:*

DONALD J. QUIGG

*Attesting Officer*          *Acting Commissioner of Patents and Trademarks*

UNITED STATES PATENT AND TRADEMARK OFFICE
CERTIFICATE OF CORRECTION

PATENT NO. : 4,454,632

DATED : 6/19/84

INVENTOR(S) : Richard Nix and Keith V. Leigh-Monstevens

It is certified that error appears in the above-identified patent and that said Letters Patent are hereby corrected as shown below:

Sheet 1, in the Drawings:
FIG. 1, change present reference numeral "44" to --43--; add a new reference numeral --44-- applied to the flange of the cylinder 14; add an arrowhead to the end of the drawline reference numeral "42".

FIG. 2, add an arrowhead to the end of the drawline of reference numeral 42; add reference numeral --43--.

Sheet 2
FIG. 6, add reference numeral --36-- applied to the hemispherical end of the rod 22.

Sheet 4,
FIG. 12, add reference numeral --94-- applied to the plastic insert on the rod end 90, and reference numeral 96 applied to the bore of the plastic insert 94.

Signed and Sealed this

Fifth Day of November 1985

[SEAL]

Attest:

DONALD J. QUIGG

Attesting Officer

Commissioner of Patents and Trademarks